United States Patent Office 2,919,714
Patented Jan. 5, 1960

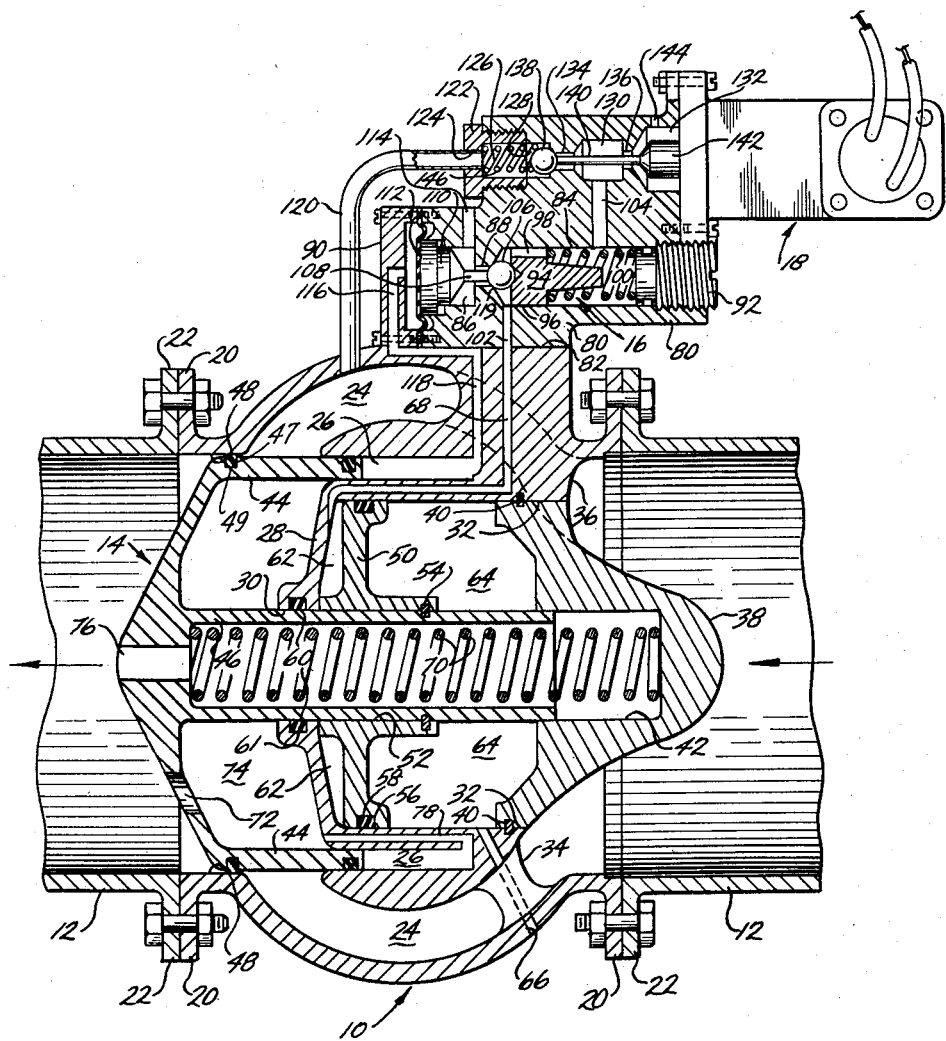

2,919,714

PRESSURE BALANCED REGULATING AND SHUT-OFF VALVE

James A. Mrazek, South Glastonbury, Conn., assignor to United Aircraft Corporation, East Hartford, Conn., a corporation of Delaware Application January 3, 1958, Serial No. 707,001

9 Claims. (Cl. 137—220)

This invention relates to improvements in valves, and more particularly, to a valve assembly adapted for regulating the pressure within a fluid conduit and for selectively preventing the flow of fluid through said conduit.

It is the general object of the invention to provide a pressure regulating and shut-off valve assembly adapted to be coupled in a fluid conduit for regulating the pressure therein and for selectively preventing flow therethrough and which includes a pressure balanced movable valve member whereby increased accuracy in pressure regulating operation of the valve is obtained and the valve performance is generally improved.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

The single figure of the drawing illustrates the pressure regulating and shut-off valve assembly of the present invention predominantly in cross section but with selected portions thereof shown in elevation.

While the valve assembly shown in the drawing is adaptable for a wide variety of uses, its advantages can be readily understood from an explanation of its use in connection with a pneumatic starter for a turbine engine used on aircraft.

Pneumatic starters for turbo-jet engines and the like require, for effective operation, an air supply which falls within a relatively limited pressure range. In multi-engine aircraft, one engine may be started with a pneumatic starter connected to a ground supply of compressed air and the starters on the other engines may then utilize air bled from the compressor of the first engine started. It will be understood that pressure regulating means are desirable for regulating the pressure to the pneumatic starter whether the supply of compressed air is provided by the compressor of the first engine started or from a ground supply, and it will be seen that pressure regulating means are particularly necessary to regulate the pressure in the line from the engine compressor. It will also be apparent that the need for pressure regulation exists only during the relatively short time required to start the engines and that shut-off means are then required so that starter operation will cease.

In accordance with the present invention, automatically operable pressure regulating means and shut-off means are incorporated for remote actuation by an operator such as the pilot or flight engineer.

The major components of the valve assembly are shown in the single figure of the drawing and include a valve housing 10 coupled in a conduit 12 and a throttle valve 14 disposed within the housing 10 for pressure responsive longitudinal movement therein in one direction and an opposite direction for opening and closing whereby to control downstream pressure in the conduit 12 or to shut off flow therein. The assembly also includes a valve 16 which regulates the throttle valve actuating pressure and a solenoid 18 which operates valve means adapted to open or to shut off the supply of throttle valve actuating pressure from a suitable source.

Referring to the drawing in greater detail, it will be seen that the valve housing 10, in the preferred embodiment of the invention shown, takes a generally spherical form truncated on opposite sides, the housing truncations being transverse with respect to the conduit 12. Marginal flanges 20, 20 are provided at each truncated surface of the housing 10 for cooperation with similar marginal flanges 22, 22 formed on the conduit 12 whereby to connect the valve housing in the conduit. An annular passageway 24 is provided in the housing 10 for directing a flow of pressurized air generally longitudinally therethrough from right to left or from the conduit 12 upstream of the throttle valve 14 to the conduit 12 downstream of said throttle valve. Radially inwardly of said annular passageway, the housing 10 defines a longitudinally extending annular chamber 26 open at the downstream or forward end thereof and, radially inwardly of the annular chamber 26, the housing 10 is formed to provide a transversely extending wall 28. A centrally located circular aperture 30 is provided in the housing wall 28 and the housing 10 is further formed rearwardly of said wall to provide a generally cylindrical cavity 32 which is open at the upstream or rearward end thereof, the housing wall 28 comprising the downstream or forward end of said cavity.

First and second struts 34 and 36, for supporting the central portion of the housing 10, are provided and extend from the outer to the inner walls of the annular passageway 24. A plug 38 is provided for the open and rearward end of the cylindrical cavity 32 and is adapted to be positively retained therein, as by a lock ring 40. In preferred form, the central portion of the plug 38 is formed to provide a rearwardly extending projection having an internal longitudinally extending cylindrical cavity 42 which is open at its forward end and which is coaxial with the circular aperture 30 in the housing wall 28 and of a similar diameter.

In preferred form, the throttle valve 14, which is disposed within the housing 10 for longitudinal opening and closing movement therein, is of generally cylindrical cup-shape. As shown in the drawing, the throttle valve 14 is disposed within the housing 10 with its open end facing rearwardly and with its sides 44 located in the annular chamber 26 for longitudinal movement therein. Preferably, the throttle valve 14 is formed to provide a hollow cylindrical central projection 46 which extends rearwardly through the circular aperture 30 in the housing wall 28 and into the cylindrical cavity 42 in the plug 38. The forward and closed end of the throttle valve 14 may be slightly convex when viewed from the conduit 12 downstream of the valve assembly so as to provide for smooth air flow thereover from the annular passageway 24 and into the conduit 12 downstream of the valve.

It will be seen that the throttle valve 14 is movable longitudinally in the housing 10, the valve sides 44 being slidably disposed in the annular chamber 26 and the central cylindrical projection 46 of the valve being slidably disposed within the circular aperture 30 in the housing wall 28 and the cylindrical cavity 42 of the plug 38. When the throttle valve 14 is moved to the extreme forward position, an annular seal 47 disposed in an annular groove 49 located at the forward end of the sides of said valve engages a valve seat 48 formed at the downstream end of the annular passageway 24 and the sides 44 of said valve prevent the flow of pressurized air from said passageway into the downstream portion of the conduit 12. In its extreme rearward position, the throttle valve 14 completely opens the downstream portion of the conduit 12 to the flow of pressurized air from the annular passageway 24. The throttle valve 14 may also be moved to various intermediate positions, decreasing valve downstream pressure when moved in the closing direction and increasing said pressure when moved in the opening direction whereby to regulate said downstream pressure.

Additional components contained within the housing 10 are operable to move the throttle valve 14 responsive to fluid pressure to said open and closed positions and to said intermediate positions and said additional components may include piston means adapted to be connected to the throttle valve 14 and to be longitudinally movable therewith. In preferred form, said piston means comprise a piston 50 disposed in the cylindrical cavity 32 between the housing wall 28 and the plug 38 and formed to provide a central circular aperture 52 suitably sized for engagement with the external surfaces of the cylindrical projection 46 of the throttle valve member 14. The piston 50 is preferably positively connected with the cylindrical projection 46, as by a lock ring 54, whereby to urge the valve member 14 forwardly and rearwardly therewith. An annular seal 56 is provided for preventing air leakage between the periphery of the piston 50 and the sides of the cavity 32 and is disposed in an annular groove 58 provided in said piston. A second annular seal 60 prevents air leakage between the housing wall 28 and the cylindrical projection 46 and is disposed in an annular groove 61 provided in said wall. The plug 38 and the circular aperture 52 in the piston 50 may be sized so as to provide air-tight fits with the end portion of the cylindrical cavity 32 and with the cylindrical projection 46 respectively or, alternatively, additional annular seals may be provided for preventing air leakage at these mating surfaces.

From the foregoing, it will be seen that a first air-tight annular chamber 62 is provided within the housing cavity 32 forwardly of the piston 50, said piston cooperating with the housing 10, and particularly with the housing wall 28, and with the cylindrical throttle valve projection 46 to define said chamber. The plug 38 constitutes means cooperating with the housing 10, the piston 50, and the cylindrical valve projection 46 to define a second air-tight annular chamber 64. The chamber 62, which may hereinafter be referred to as the throttle valve actuating chamber, in accordance with the present invention, is connectible with a source of air under pressure for urging the piston 50 and the throttle valve 14 toward the open position against the bias of substantially constant force means. The chamber 64 is connectible with a source of fluid at a reference pressure for urging the piston 50 and the throttle valve 14 toward the closed position. Since atmospheric pressure constitutes a convenient reference, it is the preferred practice to provide means for connecting the chamber 64 with the atmosphere and said means may comprise an air passageway 66 extending from the outer surface of the valve housing 10 through the strut 34 to the said chamber. An air passageway 68 in the housing 10 communicates with the chamber 62 and extends upwardly for a supply of air under pressure, the manner and means of supplying pressurized air thereto being described more fully hereinafter. The spring 70 and the pressure in chamber 64 constitute the substantially constant force means urging the throttle valve toward the closed position.

A final valve component operable for positioning the throttle valve 14 may comprise a spring 70 disposed within the hollow cylindrical projection 46 of said throttle valve member, a seat for the spring 70 being provided by the rearward end of the cylindrical cavity 42 in the plug 38. The spring 70 acts within the cylindrical projection 46 upon a central portion of the closed end of the throttle valve 14 to urge said valve member toward the closed position in cooperation with the air at atmospheric pressure in the chamber 64.

In accordance with the present invention, means are provided for balancing the pressure forces exerted by valve downstream air on the throttle valve member 14. In the presently preferred embodiment of the invention, a first aperture 72 is provided in the forward end of the throttle valve 14 for directing air at valve downstream pressure rearwardly therethrough to an annular chamber 74, said chamber being defined by a portion of the forward end of said throttle valve, the throttle valve sides 44, the cylindrical projection 46, and the housing wall 28. Air at valve downstream pressure in the chamber 74 acts on a first portion of the rearwardly facing surface of the throttle valve 14 whereby to balance the pressure forces exerted by the downstream air on an equal area of the forwardly facing surface thereof. A second aperture 76 is formed in the forward end of the throttle valve 14 near the center thereof and allows air at valve downstream pressure to act on an additional rearwardly facing surface of the throttle valve 14 within the cylindrical projection 46 and at the open end of said projection. The annular chamber 26 within which the sides 44 of the throttle valve 14 are movably disposed is also supplied with air at valve downstream pressure, an air passageway 78 extending therefrom to the chamber 74. Valve downstream air in the chamber 26 acts on a final portion of the rearwardly facing surfaces of the throttle valve 14 comprising the end surfaces of the throttle valve sides 44. Thus, it will be seen that air at valve downstream pressure is directed through the apertures 72 and 76 and through the air passageway 78 for action on rearwardly facing surfaces of the throttle valve 14 which have a total area equal to the total area of the forwardly facing surfaces of said throttle valve. As a result, the net force exerted on the throttle valve 14 by downstream air is zero or of insignificant magnitude and, as a consequence, the throttle valve 14 positioning forces which are provided by the spring 70, the pressurized air in the chamber 62 and the atmospheric air in the chamber 64 have complete control over the position of said throttle valve, inaccuracies in valve operation which might be caused by variations in valve downstream pressure being eliminated.

Stated differently, the position of the throttle valve 14 may be accurately controlled at all times by the pressure forces exerted in the chambers 62 and 64 and by the force of the spring 70, even though these forces are of relatively low magnitude. Extraneous forces on the throttle valve 14 introduced by valve downstream air, if present at all, will be of insignificant magnitude and, hence, incapable of altering the position of said throttle valve so as to introduce error in the pressure regulating operation of same. Furthermore, when the pressure of the air in the chamber 62 is reduced so as to cause shut-off operation of the valve, the spring 70 does not have to overcome the pressure forces of valve downstream air on the throttle valve 14 in order to fully close same and, as a result, a relatively light spring will insure positive closing action of said valve.

As mentioned above, the chamber 62 is connectible with a source of air under pressure, the air passageway 68 in the valve housing 10 communicating with said chamber for this purpose. In accordance with the present invention, means responsive to the air pressure downstream of the valve and operable to control the pressure of the air in the chamber 62 is provided, said means comprising, in preferred form, the control or regulating valve 16 which is adapted to control the pressure in the passageway 68, and, thus, the pressure in the throttle valve actuating or control chamber 62. The control valve 16, as illustrated in the drawing, is contained in a housing 80 which may be affixed to a pad 82 provided on the valve housing 10 adjacent the outer end of the strut 36. Cap screws or other means, not shown, may be utilized for rigidly connecting the housing 80 to the pad 82.

A cylindrical cavity 84 formed in the housing 80 is connected to a second cylindrical cavity 86, also formed in said housing, by a port 88 provided therebetween, a cap 90 serving to close the cylindrical cavity 86 at the end thereof which is opposite the connecting port 88 and a set screw 92 similarly closing the cylindrical cavity 84 at the end thereof which is opposite the connecting port 88. Disposed for longitudinal movement within the cylindrical cavity 84 is a piston 94 having an enlarged portion 96 which is provided with a plurality of slots as indicated at 98 for allowing air to pass freely to opposite ends thereof. Also disposed within the cylindrical cavity 84 is a spring 100 which is seated at one end at the set screw 92 and which acts at its other end on the enlarged portion 96 of the piston 94 whereby to urge said piston leftwardly and toward the connecting port 88.

An air passageway 102 provided within the housing 80 extends from the cylindrical cavity 84 to the pad 82 of the valve housing 10 where it communicates with the air passageway 68 extending therefrom to the control chamber 62. The cavity 84 is connectible with a source of air under pressure through an air passageway 104 extending upwardly therefrom, the manner in which pressurized air is supplied to said passageway being described hereinafter. It will be seen that the piston 94 is urged leftwardly toward the connecting port 88 by the spring 100 into contact with a small spherical valve member 106 which is disposed within the cavity 84 and which is engaged by the end of a projection 108 which extends from a second piston 110 disposed in the cavity 86.

The piston 110 disposed in the cavity 86 is longitudinally movable therein, the projection 108 thereon extending through the connecting port 88 to engage the spherical valve member 106 within the cylindrical cavity 84. A diaphragm 112 associated with the piston 110 for preventing air leakage to opposite sides thereof extends over the leftwardly facing surface of said piston and is retained at its periphery between the housing 80 and the cap 90. An air passageway 114 in the housing 80 disposed on the right-hand side of the piston 110 and diaphragm 112 extends from the cavity 86 to the outer surface of said housing for communication with air at atmospheric pressure whereby to provide atmospheric vent means. An air passageway 116 is provided in the cap 90 and extends from that portion of the cavity 86 leftwardly of the diaphragm 112 and piston 110 to the pad 82 on the housing 10. At the pad 82, the air passageway 116 communicates with an air passageway 118 which extends through the housing 10 and the strut 36 to the annular chamber 26 for a supply of air at valve downstream pressure.

It will be apparent from the foregoing that the piston 94 and the piston 110 are positioned longitudinally in the cavities 84 and 86 respectively in unison and responsive to valve downstream air pressure. The slots 98 in the enlarged portion 96 of the piston 94 allow air from the passageway 104 to act on equal and opposing areas of said piston whereby no significant net positioning force is derived therefrom. The air at atmospheric pressure in the cavity 86 acts on the right-hand side of the piston 110 and the diaphragm 112 opposing the air at valve downstream pressure which acts on the left-hand side of said piston and diaphragm and the spring 100 also opposes the pressure forces exerted by valve downstream air on the piston 110 and the diaphragm 112 such that the piston 94 is at all times held in contact with the spherical valve member 106 of the piston 110. The forces exerted on the pistons 94 and 110 may be balanced and the said pistons brought to rest at a plurality of discrete positions, each position corresponding to a given value of air pressure downstream of the valve.

The pressure of the air in the control chamber 62 is controlled by movement of the pistons 94 and 110 of the control valve 16 in the manner described below. The spherical valve member 106 which is engaged by the piston 110 and movable therewith cooperates with the connecting port 88 between the cylindrical cavities 84 and 86 to define a variable area orifice 119. The area of said orifice is determined by the position of the spherical valve member 106 and the pistons 94 and 110 and the direction of air flow through the orifice is from the cavity 84 to the cavity 86 and thence to atmosphere through the air passageway 114. For example, if the valve downstream pressure increases, the pressure exerted on the piston 110 and the diaphragm 112 will be correspondingly increased moving the pistons 94 and 110 rightwardly against the opposing forces of air at atmospheric pressure in the right-hand portion of the cavity 86 and the spring 100, and the area of the orifice 119 will be increased. This will result in an increased flow of air from the cavity 84 to atmosphere through the connecting port 88, the right-hand portion of the cavity 86 and the passageway 114 and, as a consequence, the pressure of the air in the cavity 84 and in the passageways 102 and 68 and in the control chamber 62 will be decreased. The piston 50 and the throttle valve 14 will then be moved in the closing direction by the force of the spring 70 and the pressure forces of the air at atmospheric pressure in the annular chamber 64 whereby to decrease downstream pressure. Conversely, if the valve downstream air pressure decreases, the pistons 94 and 110 will be moved to the left, the flow of air from the cavity 84 of the control valve 16 to atmosphere will be decreased, the pressure of the air in the chamber 62 will be increased and the throttle valve 14 will be urged in the opening direction whereby to increase valve downstream pressure. In this manner, the pressure of the air downstream of the valve may be regulated to a preselected constant level, said preselected level being determined primarily by the force of the spring 100. It will be apparent that by substituting springs of different forces, the level of pressure to which valve downstream air is regulated may be selected in accordance with the requirements of a particular valve installation.

As mentioned heretofore, means are provided for causing the throttle valve 14 to move to its fully closed position and said means, in the preferred embodiment of the invention shown, are operable to selectively interrupt the flow of pressurized air to the control valve 16 through the air passageway 104, and said means comprise the solenoid 18 and valve means associated therewith. While any suitable source may be used for the supply of pressurized air to the control valve 16 for use in the control chamber 62, it is preferred practice to utilize valve inlet air taken from the annular valve passageway 24. Accordingly, a conduit 120 is provided and extends from the air passageway 24 to a cap screw 122 disposed within the control valve housing 80. The cap screw 122 is provided with a port 124 connecting with a cylindrical cavity 126 adapted for receiving air from the conduit 120 and passing said air to the passageway 104 in the manner described below.

The housing 80 is formed to provide a first chamber 128, a second chamber 130 and a third chamber 132; the first chamber 128 communicating with the cylindrical cavity 126 in the cap screw 122 and being of a similar diameter. The second chamber 130 is connected with the first chamber 128 by a port 134 and the chamber 130 in turn communicates with the chamber 132 by means of a connecting port 136. Disposed within the chamber 128 is a small spherical valve member 138 which is engaged by the end of a plunger projection 140, which projection in turn extends from a solenoid plunger 142 and through the port 136, the chamber 130, and the connecting port 134. The chamber 130 communicates with the air passageway 104 which extends to the cylindrical cavity 84 of the control valve 16. An atmospheric vent 144 is provided in the chamber 132 and a small spring 146 disposed partially within the cap screw cavity 126 and partially within the chamber 128 acts on the spherical valve member 138 whereby to urge said member and the solenoid plunger 142 rightwardly.

The solenoid 18, as shown in the drawing, is in the de-energized condition, the plunger 142 and the spherical member 138 being moved to the right by the spring 146. In this position, the spherical valve member 138 closes the connecting port 134 between the chambers 128 and 130 so that valve inlet air from the conduit 120 is unable to pass to the control valve 16 through the passageway 104 and the plunger 142 opens the port 136 so that the air within the control valve 16 and the control chamber 62 may bleed to atmosphere through the vent 144. Upon energization of the solenoid 18, the plunger 142 moves leftwardly and closes the connecting port 136 so as to prevent the flow of air from the control valve 16 to atmosphere through the vent 144. Concurrently, the plunger projection 140 positions the spherical valve member 138 leftwardly against the force of the spring 146 whereby to open the connecting port 134 so that valve inlet air may flow therethrough from the chamber 128 to the chamber 130 and to the control valve 16 through the air passageway 104.

Preferably, the spherical valve member 138 is of a diameter only slightly smaller than the diameter of the chamber 128 whereby the rate of flow of valve inlet air through said chamber is limited so as to limit the rate of opening of the throttle valve 14 upon energization of the solenoid 18. Furthermore, by limiting the amount of air flow which the control valve 16 must accommodate in order to accomplish pressure regulating operation of the throttle valve 14, relatively small control valve components may be utilized and relatively small air passageways provided.

The overall operation of the valve assembly should be quite apparent from the foregoing description and, therefore, only a brief summary of operation follows. Assume, for example, that the valve assembly is coupled in an aircraft engine pneumatic starter conduit 12 and that the solenoid 18 is de-energized opening the atmospheric vent 144 so that the pressure to the control valve 16 and the control chamber 62 is reduced to ambient allowing the throttle valve 14 to be moved to its fully closed position, as shown in the drawing.

To effect starter operation, the pilot or flight engineer closes a switch in the solenoid circuit to energize the solenoid. The solenoid plunger 142 moves the spherical valve member 138 to the left to allow a flow of valve inlet air to pass to the control valve 16 and closes the atmospheric vent 144. Since initially there is no substantial downstream pressure, the piston 110 and the piston 94 of the control valve 16 will be moved leftwardly by the spring 100 and air at substantially valve inlet pressure will be transmitted through the passageway 104, the control valve 16, the passageways 102 and 68 to the control chamber 62. The piston 50 will be thereby urged rearwardly opening the throttle valve 14 and pressure on the downstream side of the valve will then build up. As downstream pressure increases, the piston 110 and the piston 94 will be moved to the right whereby to vent some of the air in the valve cavity 84 to atmosphere through the connecting port 88 and the passageway 114. This action of the control valve 16 will serve to decrease the pressure in the passageways 102 and 68 and in the control chamber 62 so as to slow and finally halt the opening movement of the valve member 14. The system will come to rest with the throttle valve 14 suitably positioned for maintaining the downstream pressure constant at the selected level. Upon change in valve inlet air pressure, for example, in the increasing direction whereby valve downstream pressure is correspondingly increased, the piston 110 and the piston 94 will be moved slightly toward the right whereby to increase the amount of air bled to atmosphere from the control valve cavity 84. This operation of the control valve will, of course, decrease the pressure in the control chamber 62 and allow the throttle valve 14 to close slightly whereby to decrease the downstream pressure to the preselected level.

When the aircraft engine has started, the pilot or flight engineer opens the switch in the solenoid circuit to de-energize the solenoid 18. The plunger 142 is moved to the right so as to interrupt the flow of valve inlet air to the control valve 16 and to open the atmospheric vent 144 in the manner described above. This operation results in the air in the cavity 84 of the control valve 16 and the pressure in the valve control chamber 62 being decreased to atmospheric pressure whereby the throttle valve 14 will be moved to the fully closed position by the spring 70. The throttle valve 14 will then remain closed until starter operation is again instituted by energizing the solenoid 18.

Although not a part of the present invention, it is contemplated that means for automatically de-energizing the solenoid may be incorporated in the system. Such means may include a holding circuit to retain a starter switch or button in closed position energizing the solenoid. A timer or a centrifugally responsive switch operated by the aircraft engine can be utilized to open the holding circuit after the engine has started operation thereby automatically de-energizing the solenoid.

The invention claimed is:

1. A fluid conduit pressure regulating valve comprising a valve housing, a valve member of generally cylindrical cup-shape disposed within said housing and movable longitudinally therein in one direction and an opposite direction for opening and closing, the closed end of said cylindrical valve member being apertured whereby substantially equal fluid pressure forces are applied to opposite sides thereof, piston means disposed within said housing and connected with said valve member and movable therewith, said piston means cooperating with said valve member and housing to define a first chamber connectible with a source of fluid under pressure for urging said piston means and valve member in one direction, substantially constant force means urging said piston means and valve member in the opposite direction, and means responsive to the fluid pressure downstream of said valve and operable automatically to control the pressure of fluid in said chamber whereby to adjust the position of said valve member so as to maintain the fluid pressure downstream of said valve substantially constant.

2. A fluid conduit pressure regulating valve comprising a valve housing defining an annular passageway between the conduit on the upstream side of said valve and the conduit on the downstream side of said valve, a valve member of generally cylindrical cup-shape disposed within said housing and movable longitudinally therein between open and closed positions whereby to control the flow of fluid through said passageway, the closed end of said valve member being apertured whereby substantially equal fluid pressure forces are applied to opposite sides thereof, piston means disposed within said housing and connected with said valve member and movable therewith, said piston means cooperating with said valve member and housing to define a chamber connectible with a source of fluid under pressure for urging said piston means and valve member toward the open position, substantially constant force means urging said piston means and valve member toward the closed position, and means responsive to the fluid pressure downstream of said valve and operable automatically to control the pressure of fluid in said chamber whereby to adjust the position of said valve member so as to maintain the fluid pressure downstream of said valve substantially constant.

3. A fluid conduit pressure regulating valve comprising a valve housing, a valve member of generally cylindrical cup-shape disposed within said housing and movable longitudinally therein between open and closed positions, the closed end of said cylindrical valve member being apertured whereby substantially equal fluid pressure forces are applied to opposite sides thereof, piston means disposed within said housing and connected with said valve member and movable therewith, said piston means cooperating with said valve member and housing to define a chamber connectible with a source of fluid under pressure for urging said piston means and valve member toward the open position, substantially constant force means urging said piston means and valve member toward the closed position, means responsive to the fluid pressure downstream of said valve and operable automatically to control the pressure of fluid in said chamber whereby to adjust the position of said valve member so as to maintain the fluid pressure downstream of said valve substantially constant, and means operable selectively to override said automatically operable means and to cause said valve member to be moved to closed position.

4. A fluid conduit pressure regulating valve comprising a valve housing, a valve member disposed within said housing and movable longitudinally therein in one direction and an opposite direction for opening and closing, piston means disposed within said housing and connected with said valve member and movable therewith, said piston means cooperating with said housing to define a chamber, fluid passage means connecting said chamber with a source of fluid under pressure for urging said piston means and valve member in one direction, substantially constant force means urging said piston means and valve member in the opposite direction, a control valve disposed in said fluid passage means and operable automatically responsive to fluid pressure downstream of said valve to regulate the pressure of fluid in said chamber whereby to control the position of said valve member so as to maintain valve downstream pressure substantially constant, and valve means disposed in said fluid passage means and operable selectively to prevent flow from said source to said control valve and to vent said chamber to atmosphere through said control valve.

5. A fluid conduit pressure regulating valve comprising a valve housing, a valve member of generally cylindrical cup-shape disposed within said housing and movable longitudinally therein in one direction and an opposite direction for opening and closing, the closed end of said valve member being apertured whereby substantially equal fluid pressure forces are applied to opposite sides thereof, piston means disposed within said housing and connected with said valve member and movable therewith, said piston means cooperating with said valve member and housing to define a first chamber, fluid passage means connecting said first chamber with a source of fluid under pressure for urging said piston means and valve member in one direction, means defining a second chamber connectible with fluid at atmospheric pressure for urging said piston means and valve member in the opposite direction, spring means urging said piston means and valve member in the opposite direction, a control valve disposed in said fluid passage means and operable automatically responsive to fluid pressure downstream of said valve to regulate the pressure of fluid in said first chamber whereby to control the position of said valve member so as to maintain valve downstream pressure substantially constant, and valve means disposed in said fluid passage means and operable selectively to prevent flow from said source to said control valve and to vent said first chamber to atmosphere through said control valve.

6. A fluid conduit pressure regulating valve comprising a valve housing defining an annular passageway between the conduit on the upstream side of the valve and the conduit on the downstream side of the valve, a valve member of generally cylindrical cup-shape disposed within said housing and movable longitudinally therein between open and closed positions whereby to control the flow of fluid through said passageway, the closed end of said valve member being apertured whereby fluid at valve downstream pressure acts on opposite sides thereof, piston means disposed within said housing and connected with said valve member and movable therewith, said piston means cooperating with said valve member and housing to define a first chamber, substantially constant force means urging said piston means and valve member toward the closed position, first fluid passage means connecting said first chamber with a source of fluid under pressure for urging said piston means and valve member toward the open position, a control valve including atmospheric vent means interposed in said first fluid passage means, and second fluid passage means connecting said control valve with fluid at substantially valve downstream pressure, said control valve being operable responsive to valve downstream pressure to regulate the flow of fluid from said first passage means to atmosphere through said vent means whereby to control the pressure of fluid within said first chamber and the position of said valve member so as to maintain the fluid pressure downstream of said valve substantially constant.

7. A fluid conduit pressure regulating valve comprising a valve housing defining an annular fluid passageway between the conduit on the upstream side of said valve and the conduit on the downstream side of said valve and also defining a first annular chamber longitudinal of the valve and having one end open, a valve member of generally cylindrical cup-shape having its sides partially disposed within said first annular chamber and being movable longitudinally therein between open and closed positions whereby to control the flow of fluid through said passageway, the closed end of said valve member being apertured whereby fluid at substantially valve downstream pressure acts on opposite sides thereof, first fluid passageway means connecting said first chamber with fluid at substantially valve downstream pressure, piston means disposed within said housing and connected with said valve member and movable therewith, said piston means cooperating with said valve member and housing to define a second chamber, substantially constant force means urging said piston means and valve member toward the closed position, second fluid passage means connecting said second chamber with a source of fluid under pressure for urging said piston means and valve member toward the open position, a control valve including atmospheric vent means interposed in said second fluid passage means, and third fluid passage means connecting said control valve with fluid at substantially valve downstream pressure, said control valve being operable responsive to valve downstream pressure to regulate the flow of fluid from said second passage means to atmosphere through said vent means whereby to control the pressure of fluid within said second chamber and the position of said valve member so as to maintain the fluid pressure downstream of said valve substantially constant.

8. A valve for regulating air pressure in a conduit comprising a hollow generally spherical valve housing truncated on opposite sides and interposed in a conduit with the truncations transverse of the conduit, the said housing defining an annular passageway for conducting air generally longitudinally through said valve and also defining a first annular chamber which extends longitudinally of the valve internally of said annular passageway and which is open at one end, a valve member of generally cylindrical cup-shape having its sides disposed within said annular passageway for controlling the flow of fluid therethrough and within said first annular chamber for longitudinal movement therein between open and closed positions, the closed end of said valve member being apertured whereby air at substantially valve downstream pressure acts on opposite sides thereof, first air passage means connecting said first chamber with air at substantially valve downstream pressure, piston means disposed within said housing and connected with said valve member and movable therewith, said piston means cooperating with said valve member and housing to define a second chamber, substantially constant force means urging said piston means and valve member toward the closed position, second air passage means connecting said second chamber with air at substantially valve upstream pressure for urging said piston means and valve member toward the open position, a control valve including atmospheric vent means interposed in said second air passage means, and third air passage means connecting said control valve with air at substantially valve downstream pressure, said control valve being operable responsive to valve downstream pressure to regulate the flow of air from said second passage means to atmosphere through said vent means whereby to control the pressure of air within said second chamber and the position of said valve member so as to maintain the air pressure downstream of said valve substantially constant.

9. A valve for regulating air pressure in a conduit comprising a hollow generally spherical valve housing truncated on opposite sides and interposed in a conduit with the truncations transverse of the conduit, the said housing defining an annular passageway for conducting air generally longitudinally through said valve and also defining a first annular chamber which extends longitudinally of the valve internally of said annular passageway and which is open at one end, a valve member of generally cylindrical cup-shape having its sides disposed within said annular passageway for controlling the flow of fluid therethrough and within said first annular chamber for longitudinal movement therein between open and closed positions, the closed end of said valve member being apertured whereby air at substantially valve downstream pressure acts on opposite sides thereof, first air passage means connecting said first chamber with air at substantially valve downstream pressure, piston means disposed within said housing and connected with said valve member and movable therewith, said piston means cooperating with said valve member and housing to define a second chamber, substantially constant force means urging said piston means and valve member toward the closed position, second air passage means connecting said second chamber with said annular passageway for a supply of air at substantially valve upstream pressure for urging said piston means and valve member toward the open position, a control valve including atmospheric vent means interposed in said second air passage means, third air passage means connecting said control valve with air at substantially valve downstream pressure, said control valve being operable responsive to valve downstream pressure to regulate the flow of air from said second air passage means to atmosphere through said vent means whereby to control the pressure of air within said second chamber and the position of said valve member so as to maintain the air pressure downstream of said valve substantially constant, and solenoid operated valve means disposed in said second air passage means upstream of said control valve and movable to one position and to another position therein, said means being operable in one position to interrupt the flow of valve upstream air through said second passage means and to vent the air in said second passage means to atmosphere whereby to move said valve member to the closed position and being operable in the other position to allow air at valve upstream pressure to flow through said second passage means to said control valve.

References Cited in the file of this patent
UNITED STATES PATENTS

| | | |
|---|---|---|
| 845,063 | Desper | Feb. 26, 1907 |
| 1,483,991 | Slattery | Feb. 19, 1924 |
| 1,987,819 | Foulds | Jan. 15, 1935 |
| 2,038,601 | Quick | Apr. 28, 1936 |
| 2,592,474 | Schnyder | Apr. 8, 1952 |